US008913287B2

(12) United States Patent
Iguchi et al.

(10) Patent No.: US 8,913,287 B2
(45) Date of Patent: Dec. 16, 2014

(54) COLOR ERASING APPARATUS AND CONTROL METHOD OF THE COLOR ERASING APPARATUS

(75) Inventors: Ken Iguchi, Shizuoka (JP); Hiroyuki Tsuchihashi, Shizuoka (JP); Isao Yahata, Shizuoka (JP); Takahiro Kawaguchi, Shizuoka (JP); Hiroyuki Taguchi, Shizuoka (JP); Hiroyuki Taki, Shizuoka (JP); Yoshiaki Sugizaki, Shizuoka (JP); Kikuo Mizutani, Shizuoka (JP); Chiaki Iizuka, Shizuoka (JP); Hidetoshi Yokochi, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 355 days.

(21) Appl. No.: 13/315,732

(22) Filed: Dec. 9, 2011

(65) Prior Publication Data

US 2012/0147398 A1 Jun. 14, 2012

Related U.S. Application Data

(60) Provisional application No. 61/421,607, filed on Dec. 9, 2010, provisional application No. 61/493,369, filed on Jun. 3, 2011, provisional application No. 61/493,365, filed on Jun. 3, 2011.

(30) Foreign Application Priority Data

Nov. 9, 2011 (JP) ................................ 2011-245081
Nov. 9, 2011 (JP) ................................ 2011-245082

(51) Int. Cl.

| | |
|---|---|
| ***H04N 1/60*** | (2006.01) |
| ***H04N 1/46*** | (2006.01) |
| ***G06K 9/00*** | (2006.01) |
| ***B41J 2/32*** | (2006.01) |

(52) U.S. Cl.
CPC ........................................ *B41J 2/32* (2013.01)
USPC ............ 358/1.9; 358/500; 358/501; 382/162; 382/164; 382/165

(58) Field of Classification Search
None
See application file for complete search history.

(56) References Cited

U.S. PATENT DOCUMENTS 5,781,822 A * 7/1998 Nishiyama et al. ............... 399/1
6,203,603 B1 * 3/2001 Takayama et al. ......... 106/31.16

(Continued)

FOREIGN PATENT DOCUMENTS

JP 63-35051 3/1988
JP 63-287865 11/1988

(Continued)

OTHER PUBLICATIONS

Office Action of Notice of Reasons for Refusal for Japanese Patent Application No. 2011-245082 Dated Jan. 7, 2014, 5 pgs.

(Continued)

*Primary Examiner* — Madelein A Nguyen
(74) *Attorney, Agent, or Firm* — Amin, Turocy & Watson, LLP

(57) ABSTRACT

A color erasing apparatus includes a conveyance member to convey a sheet on which an image is formed of a color erasable coloring material, a color erasing part to erase a color of the coloring material of the image formed on the sheet conveyed by the conveyance member, a control part that counts the processed number of sheets images of which are color-erased by the color erasing part and determines whether the processed number of sheets exceeds a previously set threshold, and a notification interface to output a signal for notifying that, cleaning of the color erasing part is required if the processed number of sheets exceeds the threshold.

20 Claims, 16 Drawing Sheets

(56) References Cited

U.S. PATENT DOCUMENTS

| | | | | |
|---|---|---|---|---|
| 6,379,001 | B1 * | 4/2002 | Tomida et al. | 347/100 |
| 7,027,745 | B2 * | 4/2006 | Yoshida et al. | 399/25 |
| 8,116,641 | B2 * | 2/2012 | Soutome | 399/27 |
| 8,541,156 | B2 * | 9/2013 | Aoki et al. | 430/138 |
| 8,542,373 | B2 * | 9/2013 | Suzuki | 358/1.13 |
| 2001/0005458 | A1 * | 6/2001 | Yamanaka et al. | 399/43 |
| 2003/0077563 | A1 * | 4/2003 | Farmer | 434/408 |
| 2003/0104938 | A1 * | 6/2003 | Torii et al. | 503/201 |
| 2004/0234281 | A1 * | 11/2004 | Yoshida et al. | 399/24 |
| 2006/0153603 | A1 * | 7/2006 | Nishikawa et al. | 399/301 |
| 2007/0225163 | A1 * | 9/2007 | Shimbo et al. | 503/201 |
| 2007/0232489 | A1 * | 10/2007 | Tatewaki et al. | 503/201 |
| 2008/0130030 | A1 * | 6/2008 | Okunishi et al. | 358/1.9 |
| 2010/0118349 | A1 * | 5/2010 | Ozawa | 358/401 |
| 2010/0225662 | A1 * | 9/2010 | Nakayama | 345/589 |
| 2010/0289861 | A1 * | 11/2010 | Taguchi | 347/179 |
| 2011/0026958 | A1 * | 2/2011 | Shiori | 399/53 |
| 2011/0043835 | A1 * | 2/2011 | Nishide | 358/1.9 |
| 2011/0058823 | A1 * | 3/2011 | Hirai | 399/15 |
| 2011/0199625 | A1 * | 8/2011 | Sugimoto et al. | 358/1.9 |
| 2011/0211033 | A1 * | 9/2011 | Yahata et al. | 347/179 |
| 2011/0222951 | A1 * | 9/2011 | Yahata et al. | 400/645.2 |
| 2011/0234735 | A1 * | 9/2011 | Taguchi et al. | 347/179 |
| 2011/0261133 | A1 * | 10/2011 | Aoki et al. | 347/179 |
| 2011/0294052 | A1 * | 12/2011 | Aoki et al. | 430/19 |
| 2011/0304881 | A1 * | 12/2011 | Saitou | 358/1.15 |
| 2011/0305851 | A1 * | 12/2011 | Wang et al. | 428/32.31 |
| 2012/0082472 | A1 * | 4/2012 | Tonohiro | 399/66 |
| 2012/0145023 | A1 * | 6/2012 | Yoshida et al. | 101/478 |
| 2012/0306982 | A1 * | 12/2012 | Taki et al. | 347/179 |
| 2012/0306983 | A1 * | 12/2012 | Mizutani et al. | 347/179 |
| 2012/0306984 | A1 * | 12/2012 | Yahata et al. | 347/179 |
| 2012/0315591 | A1 * | 12/2012 | Tsuchihashi et al. | 432/65 |
| 2013/0001050 | A1 * | 1/2013 | Oshiro et al. | 198/780 |
| 2013/0002783 | A1 * | 1/2013 | Mizutani et al. | 347/179 |
| 2013/0002784 | A1 * | 1/2013 | Iguchi et al. | 347/179 |
| 2013/0003134 | A1 * | 1/2013 | Hazu et al. | 358/448 |
| 2013/0015623 | A1 * | 1/2013 | Iguchi et al. | 271/279 |
| 2013/0061409 | A1 * | 3/2013 | Yamaguchi et al. | 15/77 |
| 2013/0242024 | A1 * | 9/2013 | Iguchi | 347/179 |
| 2013/0258026 | A1 * | 10/2013 | Iguchi | 347/179 |
| 2013/0258379 | A1 * | 10/2013 | Yoshida et al. | 358/1.13 |
| 2013/0267412 | A1 * | 10/2013 | Kawaguchi | 503/201 |
| 2013/0287416 | A1 * | 10/2013 | Iguchi et al. | 399/46 |
| 2013/0293660 | A1 * | 11/2013 | Iguchi | 347/179 |
| 2013/0311228 | A1 * | 11/2013 | Nagata | 705/7.25 |
| 2013/0336677 | A1 * | 12/2013 | Aoki et al. | 399/234 |

FOREIGN PATENT DOCUMENTS

| | | |
|---|---|---|
| JP | 1-241583 | 9/1989 |
| JP | 3-168765 | 7/1991 |
| JP | 7-41559 | 7/1995 |
| JP | 7-306614 | 11/1995 |
| JP | 7-319337 | 12/1995 |
| JP | 09-044042 | 2/1997 |
| JP | 2010-066500 | 3/2010 |
| JP | 2010-113337 | 5/2010 |
| JP | 2012-252313 | 12/2012 |

OTHER PUBLICATIONS

Japanese Office Action for Japanese Patent Application No. 2011-245081 mailed on May 12, 2014.

Japanese Office Action for Japanese Patent Application No. 2011-245081 mailed on Mar. 6, 2014.

* cited by examiner

COLOR ERASING APPARATUS AND CONTROL METHOD OF THE COLOR ERASING APPARATUS

CROSS-REFERENCE TO RELATED APPLICATIONS

This application is based upon and claims the benefit of priority from U.S. Provisional Application Ser. No. 61/421,607 filed on Dec. 9, 2010, U.S. Provisional Application Ser. No. 61/493,369 filed on Jun. 3, 2011 and U.S. Provisional Application Ser. No. 61/493,365 filed on Jun. 3, 2011, the entire contents of which are incorporated herein by reference.

This application is based upon and claims the benefit of priority from Japanese Patent Application 2011-245081 filed on Nov. 9, 2011, and Japanese Patent Application 2011-245082 filed on Nov. 9, 2011, the entire contents of which are incorporated herein by reference.

FIELD

Embodiments described herein relate generally to a color erasing apparatus for erasing a color of an image formed on a sheet by using a color erasable coloring material and a control method of the color erasing apparatus.

BACKGROUND

There is a color erasing apparatus for erasing a color of an image from a sheet subjected to image formation. This color erasing apparatus performs a heating process on the sheet on which the image is formed using a color erasable coloring material and erases the color of the coloring material forming the image on the sheet. Besides, the color erasing apparatus determines whether or not the sheet as the object of the color erasing process can be color-erased and whether or not the color erasing process is successful.

DETAILED DESCRIPTION

According to an embodiment, a color erasing apparatus includes a conveyance member to convey a sheet on which an image is formed of a color erasable coloring material. A color erasing part to erase a color of the coloring material of the image formed on the sheet conveyed by the conveyance member. A control part that counts the processed number of sheets of images of which are color-erased by the color erasing part and determines whether the processed number of sheets exceeds a previously set threshold. A notification interface to output a signal for notifying that cleaning of the color erasing part is required if the processed number of sheets exceeds the threshold.

Hereinafter, embodiments of the invention will be described with reference to the drawings.

First Embodiment

Figure 1:
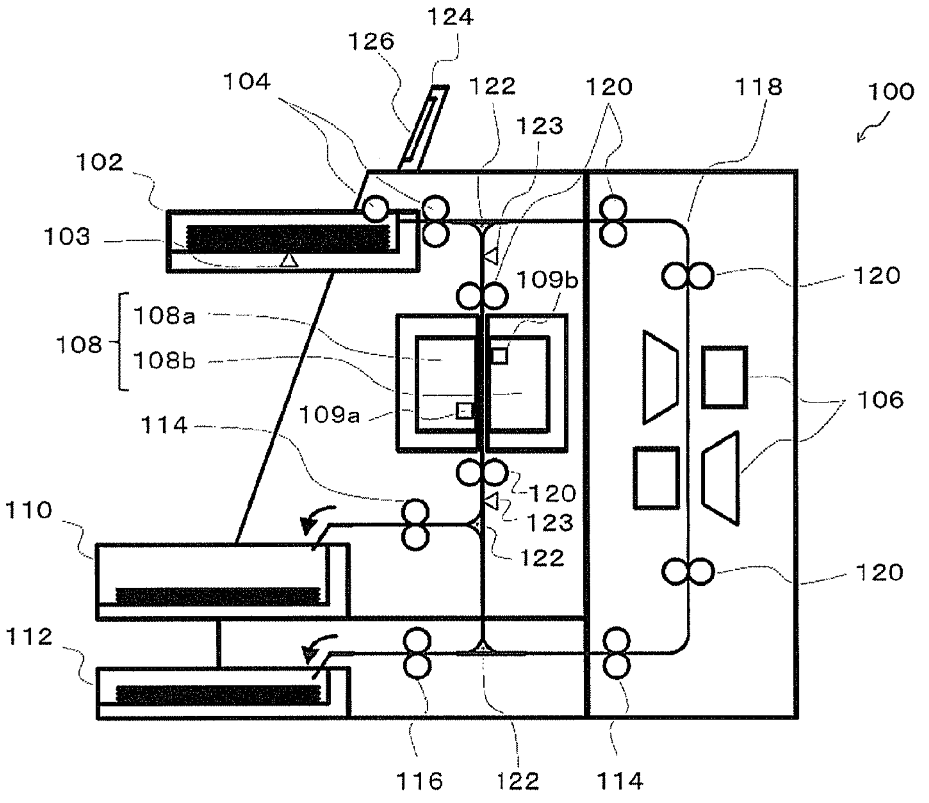
FIG. 1 is a schematic view for explaining a structure of a color erasing apparatus.

FIG. 1 is a schematic view for explaining a structure of a color erasing apparatus. The color erasing apparatus 100 performs a color erasing process to a sheet on which an image is formed using a color erasable coloring material, such as color erasing toner or color erasing ink, and erases the color of the image formed using the color erasable coloring material (hereinafter simply referred to as the recording material). The color erasing apparatus 100 includes a paper feed tray 102, a paper feed member, for example, a roller 104, a reading part 106, a color erasing part 108, a first tray 110, a second tray 112, a discharge member, for example, rollers 114 and 116, a conveyance path 118 and an operation part 124.

The paper feed tray 102 stacks sheets for reuse. The paper feed tray 102 stacks sheets of various sizes such as A4, A3 and B5. The sheets stacked on the paper feed tray 102 are sheets which were subjected to image formation by, for example, the recording material which is color-erased by being heated to a specified temperature or higher. The paper feed member 104 includes a pickup roller, a sheet supply roller and a separation roller, and supplies the sheets on the paper feed tray 102 one by one to the conveyance path 118 in the inside of the color erasing apparatus 100. Besides, the paper feed tray 102 includes a detection sensor 103 to detect the presence or absence of the sheet on the paper feed tray 102. The detection sensor 103 can be, for example, a micro sensor or a micro actuator.

The reading part 106 includes a reading unit such as a CCD (Charge Coupled Device) scanner or a CMOS sensor. In this embodiment, the reading part 106 includes two units provided along the conveyance path 118, and reads respective images on a first surface and a second surface of the sheet conveyed by a conveyance roller pair 120. That is, the reading part 106 can perform two-sided reading of the image of the conveyed sheet. The image read by the reading part 106 is stored in an after-mentioned storage part 210. For example, the image on the sheet read by the reading part 106 before the color erasing process is performed is electronized and is stored in the storage part, so that if data of the color-erased image is later required, the image data can be acquired. Besides, an after-mentioned control part 200 determines based on the image read by the reading part 106 whether or not the sheet can be color-erased or the sheet can be reused.

The color erasing part 108 erases the color of the recording material forming the image of the conveyed sheet. For example, the color erasing part 108 heats the sheet to a specified color erasing temperature in a state of contact with the conveyed sheet and erases the color of the image formed on the sheet by the recording material. For example, the color erasing part 108 of the color erasing apparatus 100 of the embodiment can include two color erasing units 108*a* and 108*b* for color erasing the first surface of the sheet and for color erasing the second surface. The color erasing units 108*a* and 108*b* can be arranged to face each other across the conveyance path 118. The color erasing unit 108*a* can contact the sheet from one side of the sheet and heats the sheet. The color erasing unit 108*b* can contact the sheet from the other side of the sheet and heats the sheet. That is, the color erasing part 108 erases the colors of the images on both surfaces of the conveyed sheet simultaneously. The color erasing part 108 includes temperature sensors 109*a* and 109*b* to detect temperatures of heating parts of the color erasing units 108*a* and 108*b*. The temperature sensors 109*a* and 109*b* can be of contact type or non-contact type.

The conveyance path 118 conveys the sheet to the reading part 106, the color erasing part 108, the first tray 110 and the second tray 112. The color erasing apparatus 100 includes plural conveyance roller pairs 120 and plural branch members 122 on the conveyance path 118. Each of the conveyance roller pairs 120 includes, for example, a pair of a drive roller and a driven roller. The branch members 122 change the conveyance direction of the conveyed sheet at respective branch points on the conveyance path 118. For example, the color erasing apparatus 100 can convey the sheet supplied from the paper feed member 104 in order of the reading part 106, the color erasing part 108 and the reading part 106. Besides, plural detection sensors 123 for detecting the conveyed sheet can be provided on the conveyance path 123. The detection sensor 123 can be, for example, a micro sensor or a micro actuator. In FIG. 1, although the detection sensor 423 near the color erasing part 108 is shown as an example, the detection sensor 123 can be arranged at an appropriate position of the conveyance path 118.

The operation part 124 provided at an upper part of a body includes a touch panel display part 126 and various operation keys. The operation keys include, for example, a numeric keypad, a stop key and a start key. The user uses the operation part 124 and instructs the function operation of the color erasing apparatus 100, such as start of color erasing or reading of the image on the sheet to be color-erased. The display part 126 displays the setting information and operation status of the color erasing apparatus 100, log information or an after-mentioned notification to the user.

The discharge members 114 and 116 discharge sheets to the first tray 110 and the second tray 112. The first tray 110 stacks the sheets from which images have been color-erased and which can be reused. The second tray 112 stacks the sheets which are determined to be unreusable. Incidentally, the sheets received by the first tray 110 and the second tray 112 can be interchanged. The setting as to which sheet is stacked on which tray, that is, the setting of the conveyance destination of the sheet can be set through, for example, the operation part 124.

The conveyance path of the sheet can be suitably changed based on a process mode performed by the color erasing apparatus 100. The color erasing apparatus 100 can have plural process modes. The color erasing apparatus 100 can have, for example, a first color erasing mode in which image reading is not performed and only a color erasing process is performed, a second color erasing mode in which after an image is read, the color erasing process is performed, a third color erasing mode in which a reading process before color erasing is not performed, and after the color erasing process is performed, a determination can be performed as to whether the sheet P is reusable, a fourth color erasing mode in which after an image is read, the color erasing process is performed and the determination process is further performed, and a reading mode in which the image color erasing is not performed and the image reading process is performed. The respective modes can be selected by the operation part 124 of the color erasing apparatus 100. Besides, the selection of the respective process modes is not limited to the operation part 124 of the color erasing apparatus 100, and the setting may be made from an external user terminal. In the first to the fourth color erasing modes, the sheet is always conveyed to the color erasing part 108. On the other hand, in the reading mode, the sheet is not conveyed to the color erasing part 108 but is discharged through the reading part 106.

Figure 2:
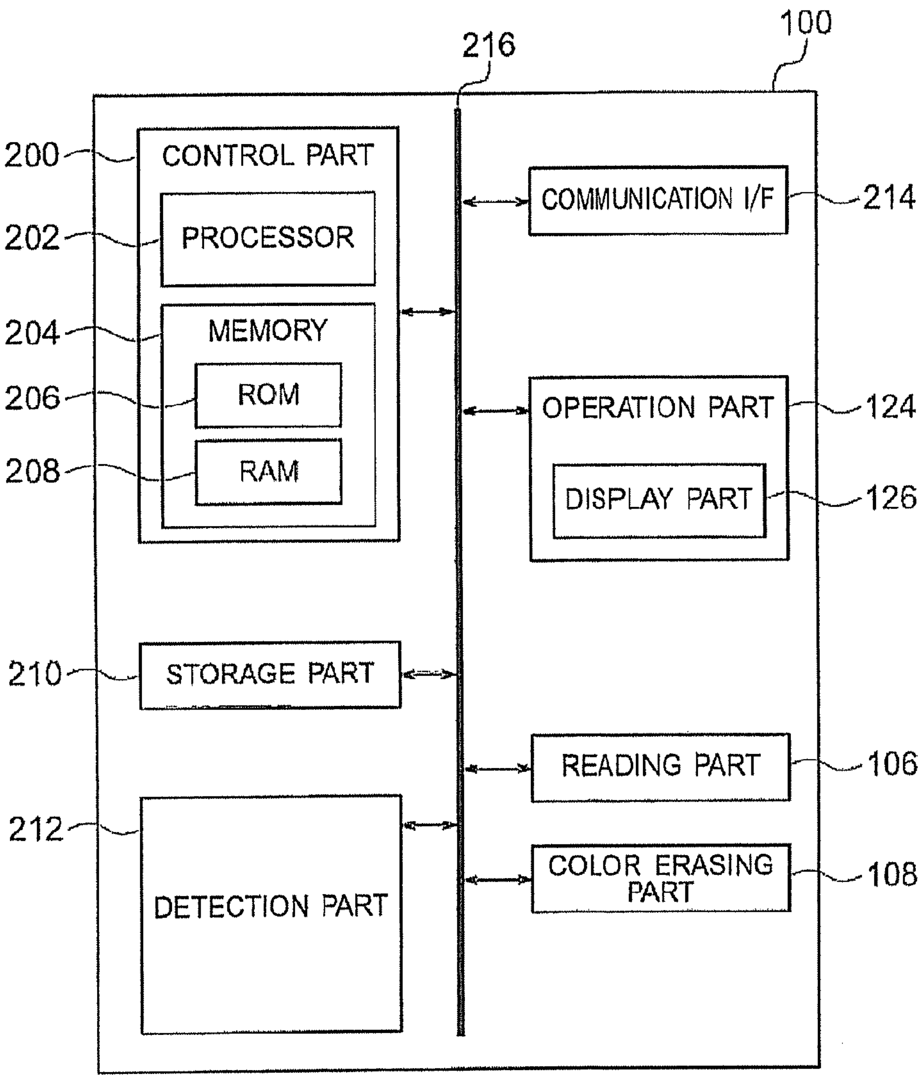
FIG. 2 is a block diagram for explaining a hardware structure of the color erasing apparatus.

FIG. 2 is a block diagram for explaining a hardware structure of the color erasing apparatus. The color erasing apparatus 100 includes a control part 200, a storage part 210, a detection part 212, a communication interface (communication I/F) 214, a display interface (display I/F) 216, the reading part 106, the color erasing part 108 and the operation part 124.

The control part (controller) 200 includes a processor 202 comprising a CPU (Central Processing Unit) or an MPU (Micro Processing Unit) and a memory 204. The control part 200 controls the reading part 106, the color erasing part 108 and the operation part 124. The memory 204 is, for example, a semiconductor memory, and includes a ROM (Read Only Memory) 206 for storing various control programs and a RAM (Random Access Memory) 208 for providing a temporal work area to the processor 202. For example, the ROM 206 can store a printing ratio of a sheet as a threshold for determining reusability, a density threshold for determining whether an image was color-erased, and the like. The RAM 208 can temporarily store an image read by the reading part 106. The respective components of the color erasing apparatus 100 can be connected via a bus 218.

The control part 200 controls the reading part 106, the erasing part 108 and the other components according to the process mode set by the operation part 124. For example, if the first to the fourth color erasing modes are selected, the control part 200 causes the color erasing part 108 to erase the color of the image on the sheet. If the reading part 106 reads the sheet before the sheet is conveyed to the color erasing part 108 (the second color erasing mode, the fourth color erasing mode), the control part 200 stores the image read by the reading part 106 into the storage part 210. Here, the control part 200 can determine whether or not inhibition data for which color erasing is inhibited, such as confidential data, is included in the data of the sheet image read by the reading part 106. Besides, if, after the color erasing part 108 erases a color of an image on a sheet, the reading part 106 reads the image on the color-erased sheet (the third color erasing mode, the fourth color erasing mode), the control part 200 determines, based on the data of the image read by the reading part 106, whether or not the sheet can be reused from the remaining state of the color erasing of the sheet. The control part 200 determines the conveyance destination of the sheet based on the determination result. If the reading mode is set in which the image is read without performing image color erasing, the control part 200 conveys the sheet to the reading part 106 without passing through the route to the color erasing part 108, and stores the image read by the reading part 106 into the storage part 210.

The control part 200 controls the respective components in the inside of the apparatus based on signals from the detection part 212. The detection part 212 includes the detection sensor 103, the temperature sensors 109*a* and 109*b* and the detection sensor 123 shown in FIG. 1, and a cover opening and closing detection sensor 304 shown in FIG. 3B.

The control part 200 determines the presence or absence of the sheet on the paper feed tray 102 based on the signal from the detection sensor 103. Besides, the control part 200 uses the temperature sensors 109*a* and 109*b* to detect the temperatures of the heating parts of the color erasing units 108*a* and 108*b*, and controls the temperatures of the heating parts of the color erasing units 108*a* and 108*b*. Besides, the control part 200 uses the detection sensor 123 to grasp the position of the sheet in the conveyance path 118. For example, the control part 200 uses the detection sensor 123 in the vicinity of the color erasing part 108, and detects the sheet which passed through the color erasing part 108. The cover opening and closing detection sensor 304 will be described later.

The storage part 210 stores an application program and an OS. The application program includes a program to execute functions of the color erasing apparatus, such as a read function of the reading part 106 and a color erasing function of the color erasing part. The application program further includes an application (Web browser) for a Web client and other applications. The storage part 210 stores an image read by the reading part 106. Besides, the storage part 210 stores the processed number of sheets processed by the color erasing apparatus 100. The storage part 210 can be, for example, a magnetic storage device such as a hard disk drive, an optical storage device, a semiconductor storage device such as a flash memory, or an arbitrary combination of these.

The communication I/F 214 is an interface to connect with an external equipment. The communication I/F 214 communicates with an external device on a network via a suitable wireless or wired connection, such as Bluetooth (registered trademark), infrared connection, optical connection, IEEE802.15, IEEE802.11, IEEE802.3 or IEEE3304. The communication I/F 214 may further include a USB connection part to which a connection terminal in conformance with USB standards is connected, a parallel interface or the like. The control part 200 communicates with external equipment, such as a multi-function peripheral, via the communication I/F 214. For example, although the storage part 210 of the color erasing apparatus 100 stores the image read by the reading part 106, no limitation is made to this. For example, communication can be performed with a user terminal (personal computer) as external equipment, a multi-function peripheral or a server via the communication I/F 214, and the image may be stored in storage parts of these external equipments. The image data stored in the external equipment can be read through the operation part of the multi-function peripheral or the user terminal. Besides, if the color erasing apparatus 100 has login and logout functions for personally identifying the user, at the time of logout of the color erasing apparatus 100, image data stored in the RAM 208 or the storage part 210 of the color erasing apparatus 100 can be transmitted to the external device and can be stored. Alternatively, data to be displayed on the external device or an instruction can be received from another component connected to the bus 218 of the color erasing apparatus 100, and a signal corresponding to the data to be displayed on the external device or the instruction can be outputted.

The display I/F 216 is connected to the display part 126. The display I/F 216 receives data to be displayed on the display part 126 or an instruction from another component connected to the bus 218. The display I/F 216 outputs a signal corresponding to the data to be displayed or the instruction to the display part 126.

Cleaning of the Color Erasing Part

The color erasing part 108 heats the sheet to the specified color erasing temperature in the state of contact with the sheet and erases the color of the image formed on the sheet by the recording material. However, the recording material is color-erased by heating of the color erasing part 108 whereupon the recording material is melted a little. There can be a case where the melted recording material adheres to the color erasing part 108.

If residual material, such as paste, adheres to the sheet, there can be a case where the residual material on the sheet passes through the color erasing part 108 and adheres to the color erasing part 108. In this case, the heating performance of the color erasing part can be reduced, and there can be an apprehension that the color erasing process will not be suitably performed. Accordingly, the color erasing part 108 of the color erasing apparatus 100 needs to be cleaned.

Figure 3A:
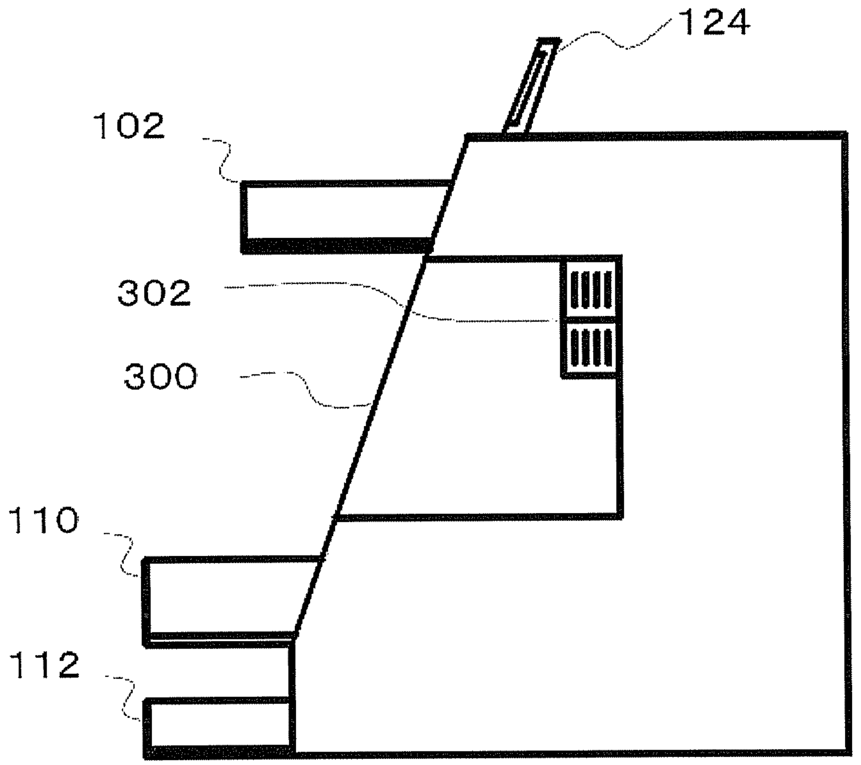
FIG. 3A is a schematic view showing a state where an opening and closing cover of the color erasing apparatus is closed.
Figure 3B:
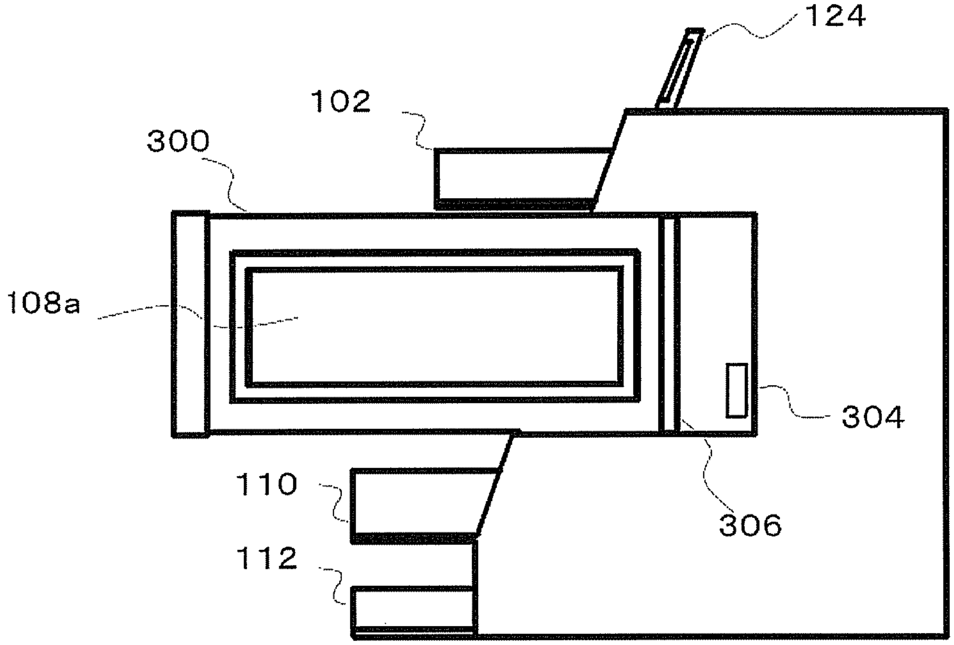
FIG. 3B is a schematic view showing a state where the opening and closing cover of the color erasing apparatus is opened.

FIGS. 3A and 3B are schematic outer appearance views for explaining the color erasing apparatus 100. FIG. 3A shows a state where an opening and closing cover 300 is closed. FIG. 3B shows a state where the opening and closing cover 300 is opened.

The color erasing apparatus 100 includes the opening and closing cover 300 and a cover open switch 302. When the cover open switch 302 shown in FIG. 3A is pressed, the opening and closing cover 300 is opened as shown in FIG. 3B. A cover opening and closing detection sensor 304 can be provided on the body side of the color erasing apparatus 100. The cover opening and closing detection sensor 304 detects whether the opening and closing cover 300 is in the open state or in the closed state. The cover opening and closing detection sensor 304 can be, for example, a micro sensor or a micro actuator. The color erasing unit 108*a*, as one of the color erasing units, can be attached to the opening and closing cover 300. Besides, one of the conveyance roller pairs 120 at the upstream side and the downstream side of the color erasing part 108 can be attached to the opening and closing cover 300. The opening and closing cover 300 can rotate around a rotation shaft 306 and can be opened, so that the color erasing apparatus 100 opens the space between the color erasing units 108*a* and 108*b* of the color erasing part 108. Accordingly, the user can easily clean a contaminated portion of the opened color erasing part 108. Alternatively, the sheet stopped in the vicinity of the color erasing part 108 can be easily removed. Incidentally, the color erasing unit 108*a* is not necessarily required to be attached to the opening and closing cover 300. For example, a structure can be such that the opening and closing cover 300 and the color erasing unit 108*a* are respectively opened and closed as separate members, and after the opening and closing cover 300 is opened, the color erasing unit 108*a* can be rotated to open the space between the color erasing units 108*a* and 108*b*.

Timing of Cleaning

Figure 4:
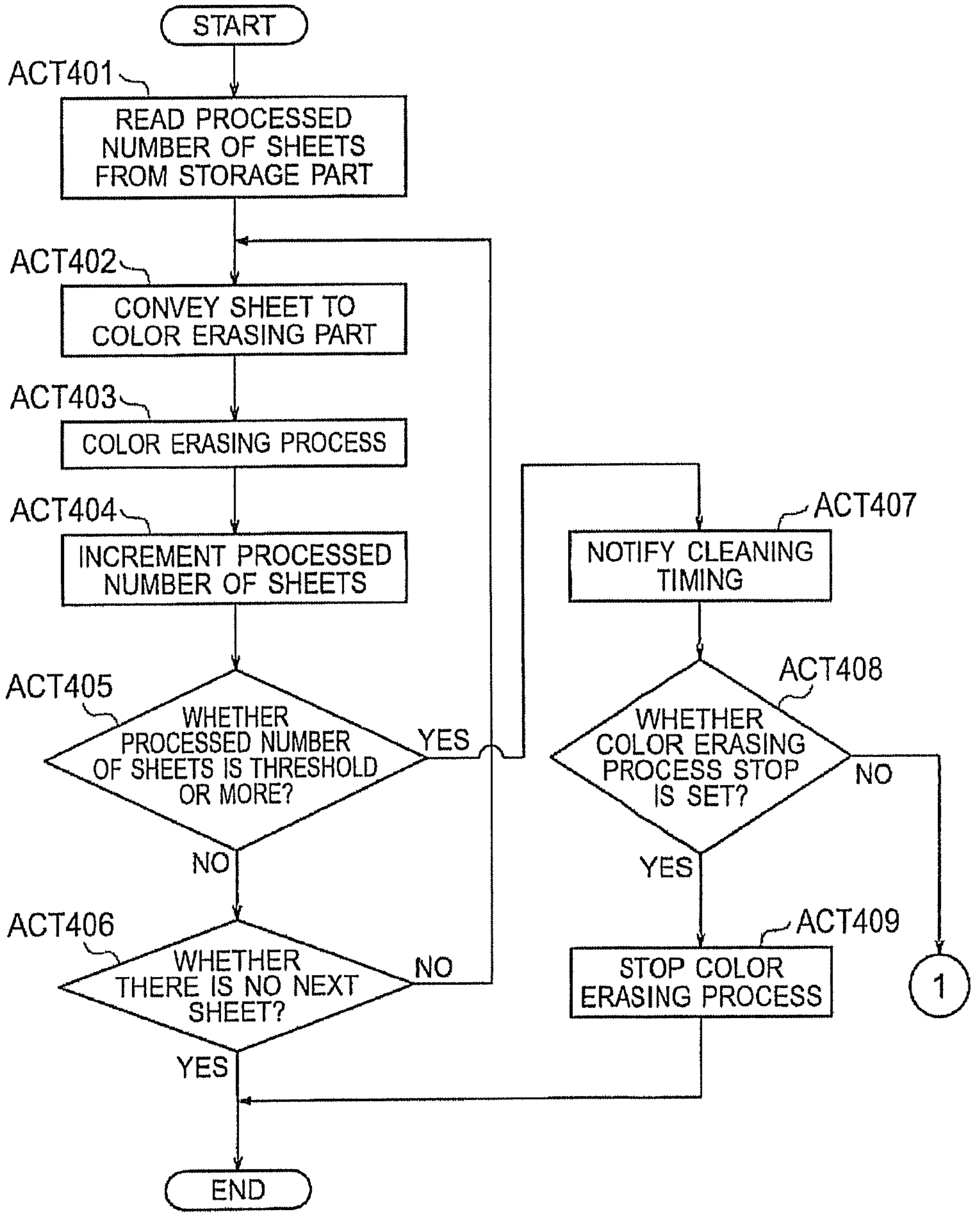
FIG. 4 is a flowchart for explaining a process of a color erasing apparatus of a first embodiment.
Figure 5:
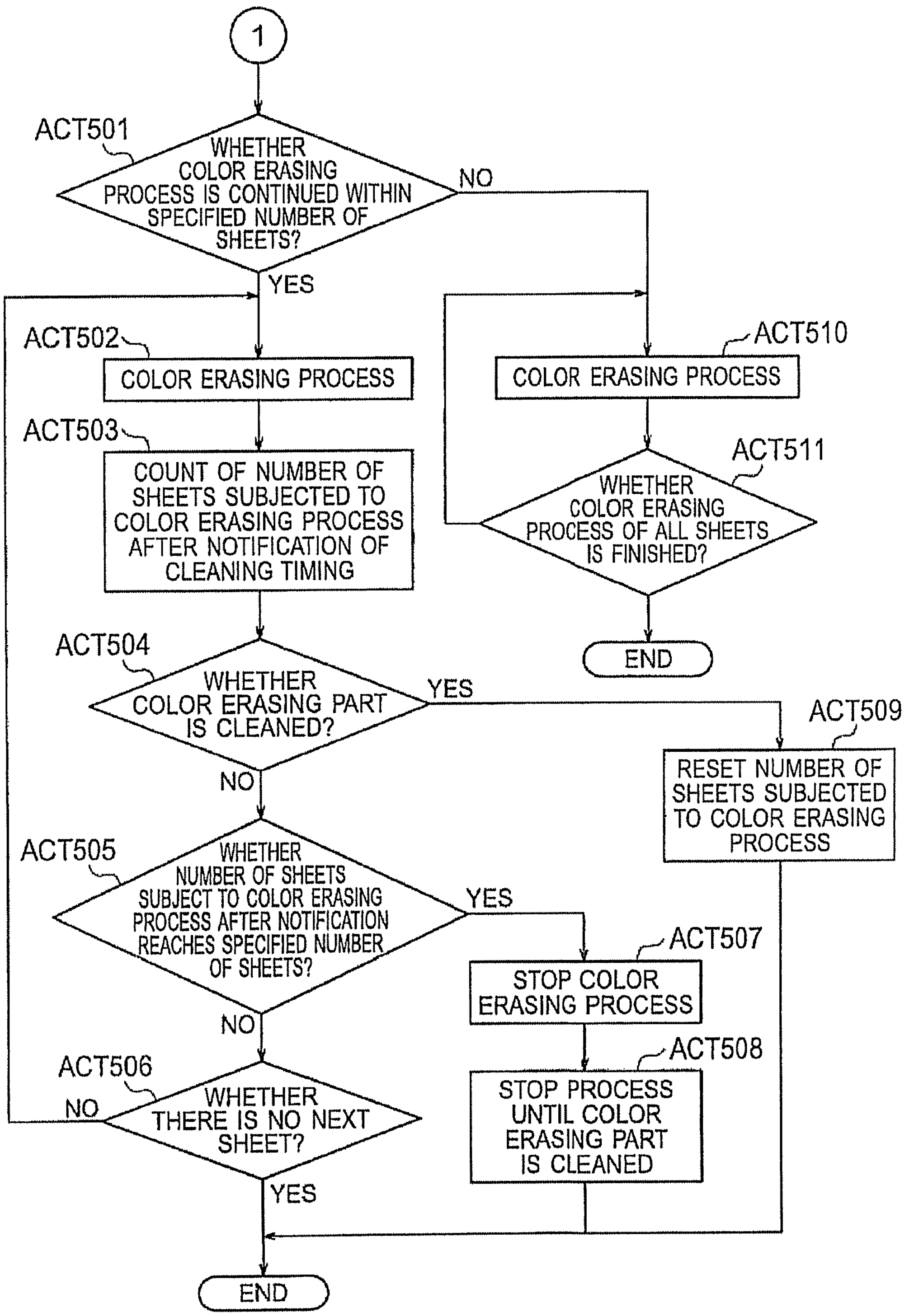
FIG. 5 is a flowchart for explaining the process of the color erasing apparatus of the first embodiment.

The color erasing apparatus 100 of this embodiment further controls the timing of cleaning of the color erasing part 108. FIG. 4 and FIG. 5 are flowcharts for explaining the process of the color erasing apparatus 100 of this embodiment.

At ACT 401, the control part 200 reads data of the processed number of sheets subjected to the color erasing process from the storage part 210. For example, at the time of start of the apparatus, the control part 200 reads the data of the processed number of sheets from the storage part 210 into the RAM 208. The processed number of sheets subjected to the color erasing process indicates the total value (count value) of the number of sheets subjected to the color erasing process after the color erasing part 108 is cleaned. The processed number of sheets can be reset by the user through the operation part 124 or the external user terminal.

If one of the foregoing process modes is selected through the operation part 124, and the start of the color erasing process is instructed, the control part 200 of the color erasing apparatus 100 feeds one sheet from the paper feed tray 102, and conveys the sheet to the color erasing part 108 (ACT 402). Next, the control part 200 causes the color erasing part 108 to erase the color of the image on the sheet (ACT 403). At ACT 404, the control part 200 increases the processed number of sheets subjected to the color erasing process by one. That is, the control part 200 increments the processed number of sheets.

Next, the control part 200 determines whether or not the processed number of sheets exceeds a predetermined threshold (ACT 405). If the processed number of sheets does not exceed the predetermined threshold (No at ACT 405), the control part 200 determines the presence or absence of a subsequent sheet (ACT 406). The control part 200 uses, for example, the detection sensor 103 and the detection sensor 123 and determines the presence or absence of the subsequent sheet. If there is no subsequent sheet (Yes at ACT 406), the control part 200 ends the color erasing process. On the other hand, if there is a subsequent sheet (No at ACT 406), the control part 200 repeats the process of ACT 402 to ACT 406.

Figure 6:
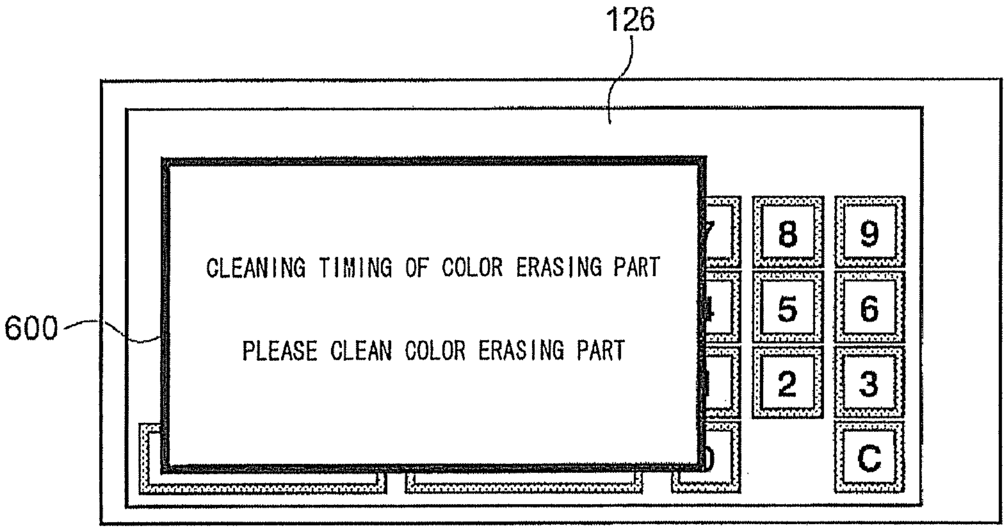
FIG. 6 is a schematic view for explaining a notification part.

At ACT 405, if the processed number of sheets exceeds the predetermined threshold (Yes at ACT 405), the control part 200 causes the notification part to notify a user that cleaning of the color erasing part 108 is required through the notification interface (notification I/F) (ACT 407). For example, as shown in FIG. 6, the control part 200 causes the display part 126 to display a screen 600 indicating that the cleaning of the color erasing part is required through the display I/F 216. Incidentally, the notification part is not limited to the display part 126 of the color erasing part 108. For example, a structure can be such that image data or a message to be displayed on a display part (notification part) of an external user terminal is transmitted through the external I/F 214 as the notification I/F. Alternatively, as shown in FIG. 7A, the color erasing apparatus 100 may include a light-emitting part 700 as the notification part. The light-emitting part 700 is a light source body such as an LED. The light-emitting part 700 is connected with the display I/F 216 as the notification I/F. For example, if the processed number of sheets exceeds the predetermined threshold, as shown in FIG. 7B, the control part 200 causes the light-emitting part to emit light. Alternatively, the notification part may notify the user by sound. By this, the user can easily know that the cleaning of the color erasing part 108 is required.

If the processed number of sheets exceeds the predetermined threshold, the control part 200 displays a message or notifies a user that cleaning is required, and stops the sheet color erasing process of the color erasing part at an after-mentioned specified timing based on predetermined setting information (ACT 408).

Figure 8:
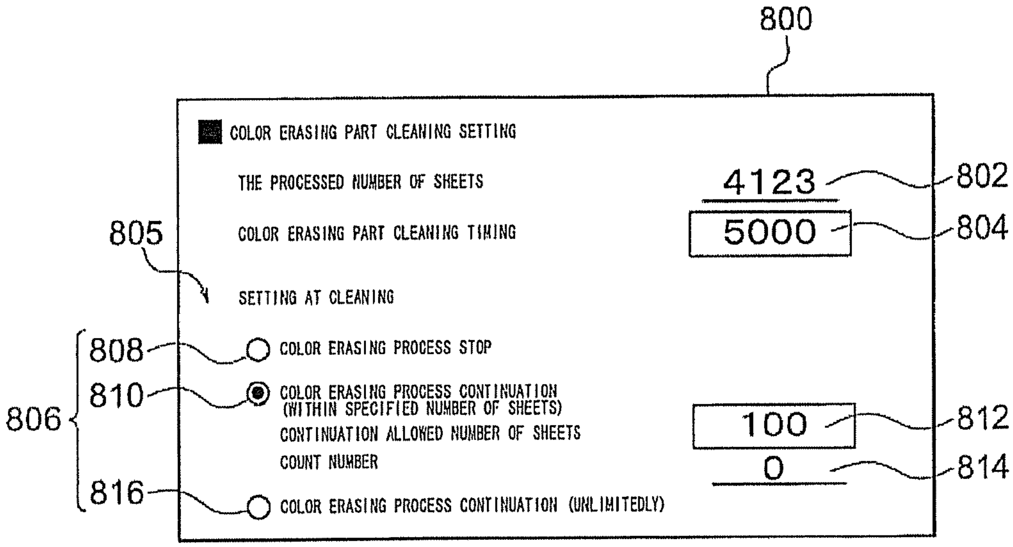
FIG. 8 is a setting screen relating to cleaning of a color erasing part.

Here, the threshold at ACT 405 may be a previously experimentally determined value or may be set and inputted by the user through the operation panel 112. FIG. 8 shows an example of a setting screen relating to the cleaning of the color erasing part 108. The setting screen 800 is displayed on the display part 126 of the color erasing part 108 or a display part of an external user terminal. The processed number of sheets subjected to the color erasing process by the color erasing part 108 is displayed in an area 802. The value of the processed number of sheets in the area 802 is reset when the color erasing part 108 is cleaned or at an arbitrary timing set, by user operation. That is, the count value of the processed number of sheets in the area 802 becomes zero. Reference numeral 804 denotes a setting column of a threshold indicating the timing of cleaning of the color erasing part. In FIG. 8, 5000 is set as the threshold in the setting column 804. That is, in this example, the color erasing apparatus 100 is set such that the color erasing process can be continuously performed for 5000 sheets without cleaning the color erasing part 108. Accordingly, if the count value of the processed number of sheets reaches the threshold set in the setting column 804, the control part 200 causes the notification part to notify a user that cleaning of the color erasing part is required. Incidentally, embodiments of the invention are not limited to the count-up system described above; a count-down system can also be adopted.

Besides, the setting information can be uniquely determined by the maker's design or may be such that the user can change the setting. Hereinafter, an example in which the user can change the setting information will be described. A process (setting information 806) to be executed by the control part 200 if the processed number of sheets exceeds the threshold previously set in the column 804 is set in an area 805 of FIG. 8. In this embodiment, as an example, the setting information 806 includes three process settings, that is, "color erasing process stop", "color erasing process continuation (within specified number of sheets)" and "color erasing process continuation (unlimitedly)". As the setting information 806, one of these three process settings is set. If the processed number of sheets exceeds the predetermined threshold, the control part 200 causes the display part 126 to notify that the cleaning of the color erasing part is required, and stops the sheet color erasing process of the color erasing part at a specified timing in accordance with the process setting which is set in the setting information 806.

If a color erasing process stop button 808 is selected as the setting formation 806, the control part 200 quickly stops the color erasing process. That is, even if a sheet exists on the paper feed tray 102, after the processed number of sheets exceeds the predetermined threshold (or after the notification part notifies that the cleaning of the color erasing part is required), the control part 200 stops feeding of sheets from the paper feed tray 102. However, with respect to the feeding of sheets, several sheets may be fed because of the time lag of control. After the color erasing process of the subsequent sheet in the conveyance path 118 is performed, the control part 200 stops the color erasing process. Alternatively, the control part 200 may perform paper feeding so that the number of sheets conveyed on the conveyance path 118 is calculated by using the detection sensor 123, and the processed number of sheets reaches the threshold by processing the sheet at the most upstream side in the conveyance path 118.

Accordingly, if the color erasing process stop button 808 is selected as the setting information 806 (Yes at ACT 408), the control part 200 quickly stops the color erasing process (ACT 409). The processed number of sheets subjected to the color erasing process is reset after the color erasing part 108 is cleaned.

If a color erasing process continuation (within specified number of sheets) button 810 is selected as the setting information 806, after the color erasing process is continued for the specified number of sheets (continuation allowed number of sheets) previously set in the setting column 812, the control part 200 stops the color erasing process. If the color erasing process continuation (within specified number of sheets) button 810 is selected, the setting column 812 becomes effective, and reception of the continuation allowed number of sheets becomes possible. A difference between the processed number of sheets displayed in the area 802 and the threshold of the setting column 804 is displayed in an area 814. That is, if the processed number of sheets exceeds the predetermined threshold, the control part 200 counts the processed number of sheets exceeding the threshold. If the processed number of sheets continued after exceeding the threshold reaches the continuation allowed number of sheets inputted to the setting column 812, the control part 200 stops the color erasing process. In other words, after the display part 126 notifies, if the continuation processed number of sheets continuously erased by the color erasing part 108 reaches the predetermined continuation allowed number of sheets, the control part 200 stops the sheet color erasing process. However, with respect to the feeding of sheets, several sheets may be fed because of the time lag of control. After the color erasing process of the subsequent sheets in the conveyance path 118 is performed, the control part 200 stops the color erasing process. Alternatively, the control part 200 may perform paper feeding so that the processed number of sheets reaches the specified number of sheets (continuation allowed number of sheets) by processing the sheet at the most upstream side in the conveyance path 118.

Accordingly, if the color erasing process continuation (within specified number of sheets) button 810 is selected as the setting information 806 (No at ACT 408, Yes at ACT 501), the control part 200 continues to feed sheets from the paper feed tray 102 and conveys the sheet to the color erasing part 108. Next, the control part 200 causes the color erasing part 108 to erase the color of the image of the sheet (ACT 502). At ACT 503, if the processed number of sheets exceeds the predetermined threshold, the control part 200 counts the processed number of sheets exceeding the threshold.

After the display part 126 notifies a user, if the color erasing part 108 is not cleaned (No at ACT 504), the control part 200 determines whether or not the processed number of sheets continuously processed after exceeding the threshold reaches the predetermined specified number of sheets (continuation allowed number of sheets) (ACT 505). If the continuously processed number of sheets does not reach the specified number of sheets (No at ACT 505), the control 200 determines the presence or absence of a subsequent sheet (ACT 506). If there is no subsequent sheet (Yes at ACT 506), the control part 200 ends the color erasing process. If a new sheet is placed on the paper feed tray 102 and the color erasing process is instructed in a state where the color erasing part 108 is not cleaned and the continuously processed number of sheets does not reach the predetermined specified number of sheets (continuation allowed number of sheets), the control part 200 performs the process from ACT 502. On the other hand, if there is a subsequent sheet (No at ACT 506), the control part 200 repeats the process of ACT 502 to ACT 506.

At ACT 505, if the continuously processed number of sheets reaches the predetermined specified number of sheets (Yes at ACT 505), the control part 200 stops the color erasing process (ACT 507). In other words, after the display part 126 notifies a user, if the continuously processed number of sheets continuously erased by the color erasing part 108 reaches the predetermined continuation allowed number of sheets, the control part 200 stops the sheet color erasing process. The control part 200 stops the process until the color erasing part 108 is cleaned (ACT 508).

After the display part 126 notifies a user, if the color erasing part 108 is cleaned (Yes at ACT 504), the control part 200 resets the processed number of sheets in the area 802 of FIG. 8 and the count number in the area 814 (ACT 509).

If a color erasing process continuation (unlimitedly) button 816 is selected as the setting information 806, the control part 200 continues the color erasing process until sheets to be conveyed are used up. In other words, the control part 200 performs the color erasing process to all sheets on the paper feed tray 102.

That is, if the color erasing process continuation (unlimitedly) button 816 is selected as the setting information 806 (No at ACT 408, No at ACT 501), the control part 200 continues to feed sheets from the paper feed tray 102 and performs the color erasing process (ACT 510). The control part 200 continues the color erasing process until sheets to be conveyed are used up (ACT 511). In other words, the control part 200 performs the color erasing process to all sheets on the paper feed tray 102.

Whether the color erasing part 108 is cleaned is determined such that for example, after the processed number of sheets exceeds the predetermined threshold (or after the display part 126 notifies), if the opening and closing of the opening and closing cover 300 is detected through the cover opening and closing detection sensor 304, the control part 200 determines that the color erasing part 108 is cleaned. When determining that the color erasing part 108 is cleaned (when detecting the opening and closing of the opening and closing cover 300), the control part 200 causes the display part 126 to display the screen to inquire whether the cleaning is completed. When receiving the input indicating that the cleaning is completed, the control part 200 resets the processed number of sheets in the area 802 and the count number in the area 814. When determining that the color erasing part 108 is cleaned (when detecting the opening and closing of the opening and closing cover 300), the control part 200 can inquire from the user whether the processed number of sheets in the area 802 and the count number in the area 814 are to be reset. Incidentally, if the color erasing apparatus 100 includes a key for resetting the processed number of sheets and the count number, when the reset key is depressed, the control part 200 can reset the processed number of sheets and the count number without determining whether the color erasing part 108 has been cleaned.

Besides, in the embodiment, although the description is made such that the color erasing part 108 heats the sheet to the specified temperature in the state of contact with the sheet, the color erasing part 108 is not limited to this. The color erasing part 108 can heat the sheet to the specified color erasing temperature by a non-contact heating part. Also in the case of the non-contact type, the color erasing part 108 guides the conveyed sheet. That is, a melted recording material of the sheet adheres, or a residual material adhered to the sheet adheres to the color erasing part 108. Accordingly, even if the color erasing part 108 is of the non-contact type, cleaning is required.

Besides, in the embodiment, although the description is made on the apparatus in which if the processed number of sheets exceeds the predetermined threshold (Yes at ACT 405), the control part 200 causes the notification part to notify a user that the cleaning of the color erasing part 108 is required through the notification interface (notification part I/F), the color erasing apparatus 100 is not limited to this. For example, the color erasing apparatus 100 may cause the notification part to notify that cleaning is required through the notification interface (notification I/F) when the processed number of sheets reaches a number smaller than the predetermined threshold by a specified number of sheets (near full). For example, if the number of sheets at which cleaning should be performed is set to 5000, the color erasing apparatus can notify that cleaning is required at the time when the processed number of sheets reaches 4900.

The color erasing apparatus 100 of the embodiment can notify the user that the cleaning of the color erasing part is required at the suitable timing. Besides, since the timing when the color erasing process is stopped can also be arbitrarily set by the user, the usability is high.

Incidentally, in the embodiment, the description is made on the color erasing apparatus 100 which is independently provided as the color erasing apparatus, no limitation is made to this. For example, an integrated system structure may be adopted in which the color erasing apparatus is incorporated in an image forming apparatus such as a printer or a multi-function peripheral. The notification part may be an operation panel of the image forming apparatus or a display part of an external user terminal connected through a network.

Second Embodiment

In the first embodiment, the description is made on the apparatus in which the timing of cleaning is determined based on the processed number of sheets. In a second embodiment, a control part 200 measures temperature of a color erasing part 108 and determines the timing of cleaning of the color erasing part 108.

That is, a color erasing apparatus 100 of this embodiment includes a conveyance path along which a sheet is conveyed, a color erasing unit which includes a heating member and a first surface member arranged between the heating member and the conveyance path and erases a color of an image on the sheet by heating the sheet by the heating member through the surface member, a second surface member provided at an opposite side of the color erasing unit across the conveyance path, a first temperature sensor to detect temperature of the first surface member, a second temperature sensor to detect temperature of the second surface member, a control part which heats the heating member and determines whether a difference between the temperatures detected by the first temperature sensor and the second temperature sensor is larger than a predetermined threshold, and a notification part to notify that cleaning of the color erasing part is required if the temperature difference is larger than the threshold.

Besides, when the sheet color erasing process is not performed, the control part heats the heating member of the color erasing unit, and determines whether the difference between the temperatures detected by the first temperature sensor and the second temperature sensor is larger than the predetermined threshold.

Besides, the color erasing apparatus further includes another color erasing unit arranged to face the color erasing unit across the conveyance path. The another color erasing unit includes a heating member and a second surface member arranged between the heating member and the conveyance path, and when the sheet color erasing process is not performed, the control part heats only the heating member of the color erasing unit, and determines whether the difference between the temperatures detected by the first temperature sensor and the second temperature sensor is larger than the predetermined threshold.

With respect to the respective parts of this embodiment, the same portions as those of the color erasing apparatus of the above embodiment are denoted by the same reference numerals, and the feature portion of this embodiment will be described.

Figure 9:
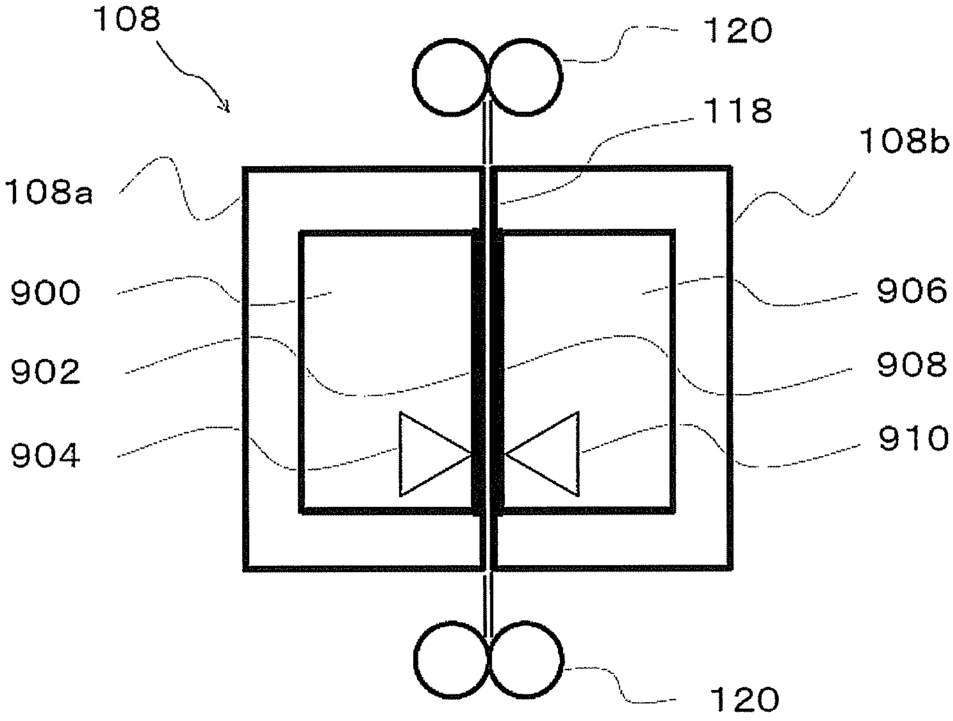
FIG. 9 is a schematic view for explaining the color erasing part.

FIG. 9 is a schematic view for explaining the color erasing part 108. A color erasing unit 108*a* of the color erasing part 108 includes a first heating part 900, a first guide member (first surface member) 902, and a first temperature sensor 904. The color erasing unit 108*b* includes a second heating part 906, a second guide member (second surface member) 908, and a second temperature sensor 910. The first heating member 900 of the color erasing unit 108*a* and the second heating part 906 of the color erasing unit 108*b* are arranged to face each other across a conveyance path 118.

The first heating part 900 and the second heating part 906 heat a conveyed sheet to erase a color of an image formed on the sheet. The first guide member 902 and the second guide member 908 are members facing the conveyance path 118. The first guide member 902 is arranged between the first heating part 900 and the conveyance path 118. The second guide member 908 is arranged between the second heating part 906 and the conveyance path 118. The first temperature sensor 904 detects the temperature of the first guide member 902. The second temperature sensor 910 detects the temperature of the second guide member 908.

Figure 10:
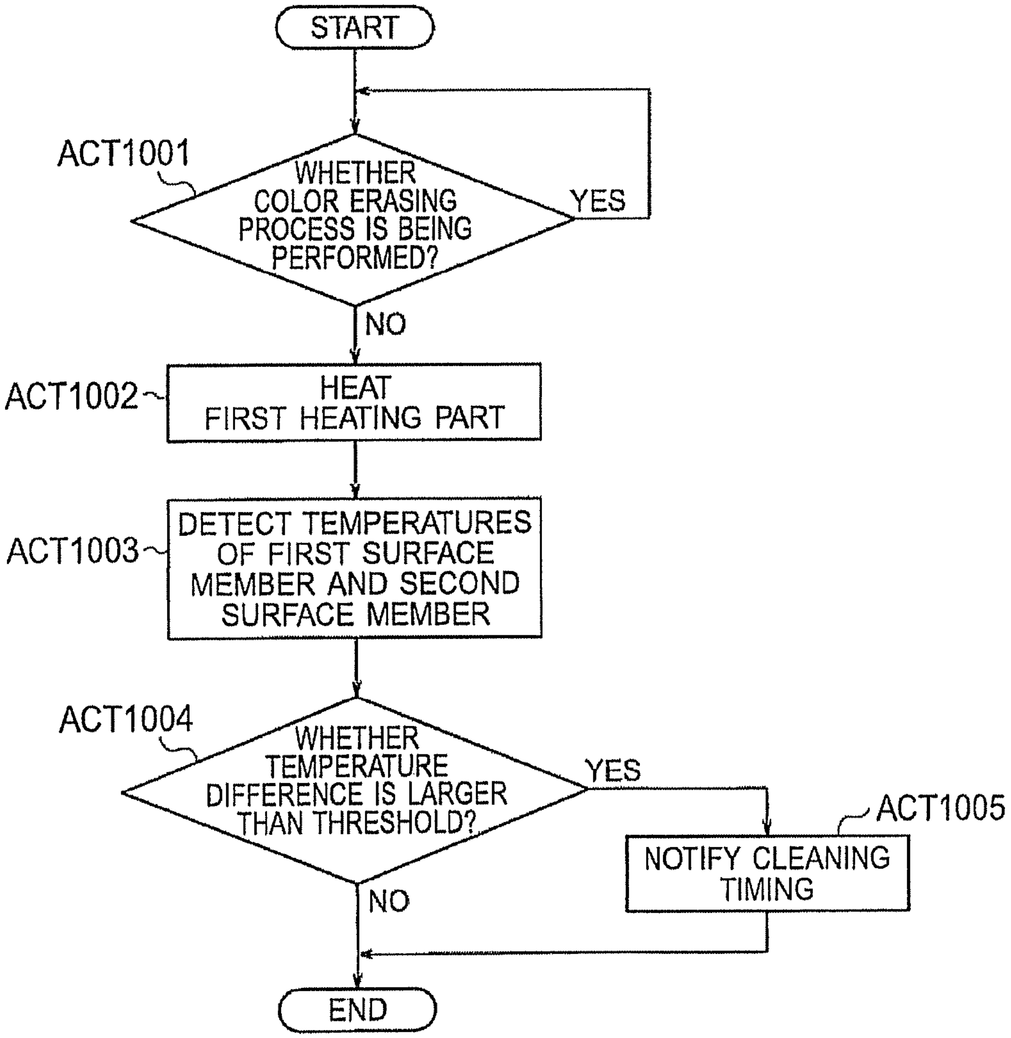
FIG. 10 is a flowchart for explaining a process of a color erasing apparatus of a second embodiment.

FIG. 10 is a flowchart for explaining the process of the color erasing apparatus 100 of the second embodiment. At ACT 1001, the control part 200 determines whether the color erasing process is being performed. For example, if the color erasing process is ended, the control part 200 proceeds to a process at ACT 1002. No limitation is made to the case where the color erasing process is ended, and the control part 200 may determine at specified timing whether or not the color erasing process is being performed. For example, the specified timing may be each period such as a specific time or the number of days. Alternatively, a determination may be made when a check instruction is received from the user.

At ACT 1002, the control part 200 heats one of the first heating part 900 of the color erasing unit 108*a* and the second heating part 906 of the color erasing unit 108*b*. Here, description is made on the assumption that the first heating part 900 is heated. Next, at ACT 1003, the control part 200 uses the first temperature sensor 904 and the second temperature sensor 910 and detects the temperatures of the first surface member and the second surface member. That is, the control part 200 detects the temperatures of the first guide member 902 and the second guide member 908.

At ACT 1004, the control part 200 determines whether or not the difference between the temperatures detected by the first temperature sensor 904 and the second temperature sensor 910 is larger than a predetermined threshold. If the difference between the temperatures detected by the first temperature sensor 904 and the second temperature sensor 910 is smaller then the predetermined threshold (No at ACT 1004), the control part ends the process. On the other hand, if the difference between the temperatures detected by the first temperature sensor 904 and the second temperature sensor 910 is larger than the predetermined threshold (Yes at ACT 1004), the control part 200 causes the notification part to notify that cleaning of the color erasing part 108 is required (ACT 1005). The threshold may be a previously experimentally determined value or may be set and inputted by the user through an operation panel 112.

Incidentally, when the control part 200 causes the notification part to notify that the cleaning of the color erasing part 108 is required, the control part may inhibit the color erasing process until the cleaning process is performed, or may allow the color erasing process to be performed until a specified number of sheets have been processed. Alternatively, when the control part 200 causes the notification part to notify a user that the cleaning of the color erasing part 108 is required, the control part can perform the erasing process without inhibiting the color erasing process until a user's instruction is given.

Besides, although the color erasing part 108 in the above description includes the two color erasing units arranged to face each other, no limitation is made to this. For example, one color erasing unit may be provided, or two color erasing units may be arranged side by side along the conveyance direction.

The color erasing apparatus 100 of the embodiment can notify the user that the cleaning of the color erasing part 108 is required at the suitable timing.

Modified Example of the Second Embodiment

Figure 11:
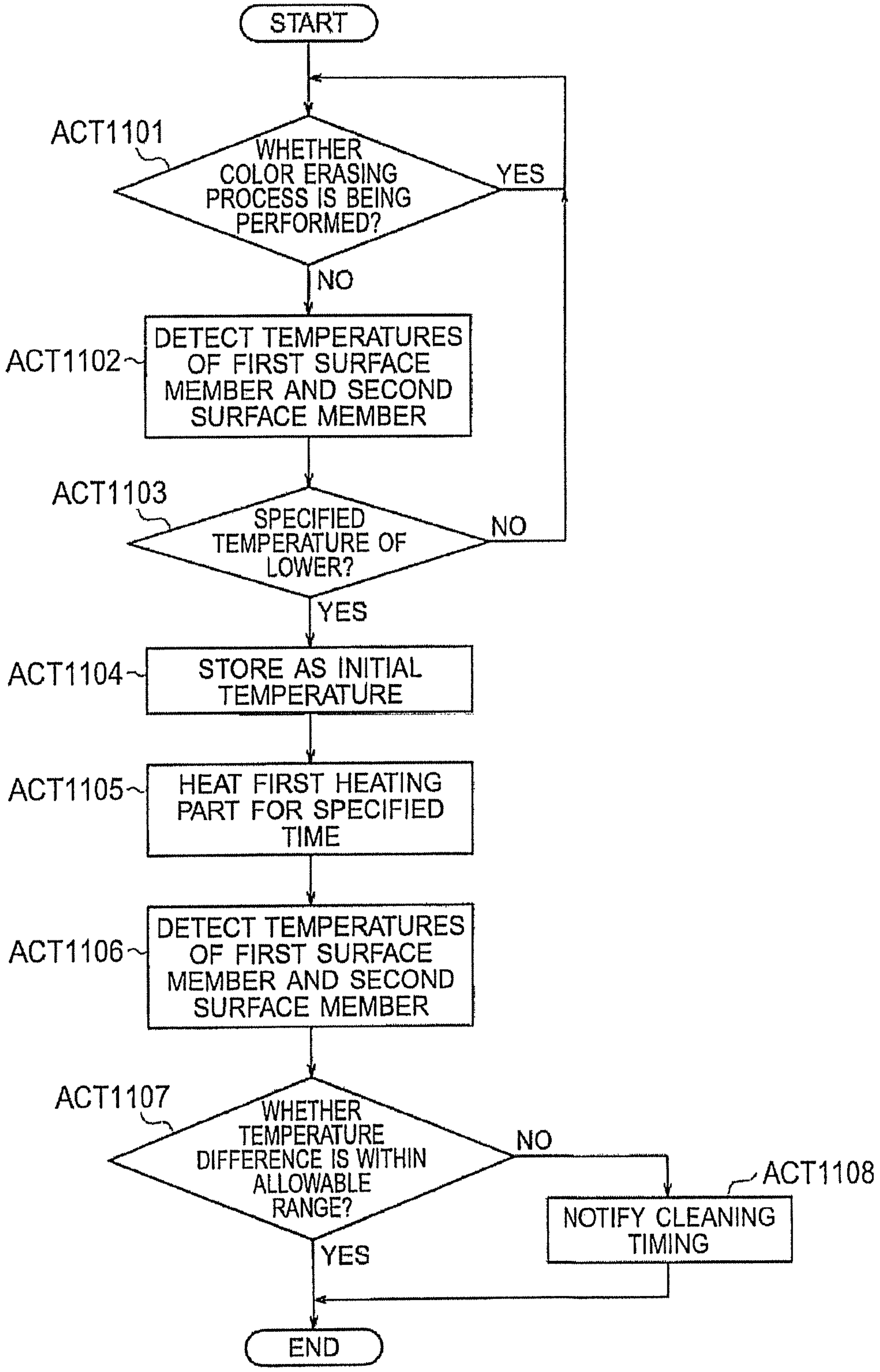
FIG. 11 is a flowchart for explaining a process of a color erasing apparatus of a modified example of the second embodiment.

In the above embodiment, description is made on the apparatus using the temperature difference between the first surface member and the second surface member. In this embodiment, description will be made on an apparatus in which based on a difference between temperature of a surface member before heating and temperature of the surface member after heating, a determination is made as to whether or not cleaning of the color erasing part 108 is required. FIG. 11 is a flowchart for explaining the process of the color erasing apparatus 100 of a modified example of the second embodiment.

If a color erasing process is not being performed (No at ACT 1101), the control part 200 uses the first temperature sensor 904 and the second temperature sensor 910 and detects temperatures of the first guide member (first surface member) 902 and the second guide member (second surface member) 908 (ACT 1102). The control part 200 determines whether the temperatures detected by the first temperature sensor 904 and the second temperature sensor 910 are not higher than a predetermined temperature (standby temperature) (ACT 1103). If the detected temperatures are not higher than the predetermined temperature (apparatus is in a standby state) (Yes at ACT 1103), the control part 200 stores the detected temperatures as the initial temperatures in the memory 204 (ACT 1104). That is, the memory 204 stores the initial temperature (first initial temperature) of the first guide member (first surface member) 902 and the initial temperature (second initial temperature) of the second guide member (second surface member) 908.

Next, the control part 200 heats one of the first heating part 900 of the color erasing unit 108*a* and the second heating part 906 of the color erasing unit 108*b* for a specified time (ACT 1105). Here, the first heating part 900 is heated. After the control part 200 heats the first heating part 900 for the specified time, the control part 200 uses the first temperature sensor 904 and the second temperature sensor 910 and measures the temperature (first temperature) of the first guide member 902 and the temperature (second temperature) of the second guide member 908 (ACT 1106). The control part 200 calculates a difference (first temperature difference) between the first temperature and the first initial temperature and a difference (second temperature difference) between the second temperature and the second initial temperature. The control part 200 compares the first temperature difference with a predetermined first value. Besides, the control part 200 compares the second temperature difference with a predetermined second value. The control part 200 determines whether or not the first temperature difference and the second temperature difference fall within an allowable range as compared with the first value and the second value (ACT 1107). Here, the first value and the second value are experimentally determined values, and are values determined on the assumption that a material is not adhered to the color erasing part 108.

If a melted recording material or residual material is adhered to the first guide member 902 and the second guide member 908, heat conduction of heat from the first heating member 900 to the second guide member 908 is reduced as compared with a case where the first guide member 902 and the second guide member 908 are not contaminated. That is, if the first guide member 902 and the second guide member 908 are contaminated, there is a case where although the difference between the first temperature difference and the first value falls within the allowable range, the difference between the second temperature difference and the second value does not fall within the allowable range. If the difference between the second temperature difference and the second value does not fall within the allowable range (No at ACT 1107), the control part 200 causes the notification part to notify that the cleaning of the color erasing part 108 is required (ACT 1108).

Incidentally, in the above embodiment, although the description is made on the case where the control part 200 determines whether or not the difference between the second temperature difference and the second value falls within the allowable range, the color erasing apparatus 100 of the embodiment is not limited to this. For example, the color erasing apparatus 100 includes corresponding data between initial temperature detected before heating and estimated temperature which is obtained based on the detected initial temperature and is to be detected when heating is performed for a specified time, and may determine whether a difference between the estimated temperature obtained based on the initial temperature and the detected temperature as the result of actual heating falls within an allowable range.

In the first embodiment and the second embodiment, although the notification part is made to notify that cleaning is required when the timing of cleaning of the color erasing part 108 occurs, the notification part may be made to notify that replacement of the color erasing part 108 is required.

Third Embodiment

The color erasing units 108*a* and 108*b* of the color erasing part 108 can attain high temperatures during the color erasing process or for a while after the color erasing process has ended. Accordingly, at least while the color erasing part is in a high temperature state, the user can preferably be prevented from touching the color erasing part. In a third embodiment, a color erasing apparatus 100 of this embodiment determines whether or not the color erasing process of the color erasing part 108 is stopped, and if the color erasing process is stopped, a message for preventing the color erasing part from being opened is notified.

The color erasing units 108*a* and 18*b* of the color erasing part 108 can attain a significantly high temperature during the color erasing process or for a while after the color erasing process has completed. Accordingly, at least while the color erasing part is in a high temperature state, the user can be preferably prevented from touching the color erasing part. In a third embodiment, a color erasing apparatus 100 of this embodiment determines whether or not the color erasing process of the color erasing part 108 is stopped, and if the color erasing process is stopped, a message for preventing the color erasing part from being opened, that is, a message for calling user's attention is notified from the display part 126.

Figure 12:
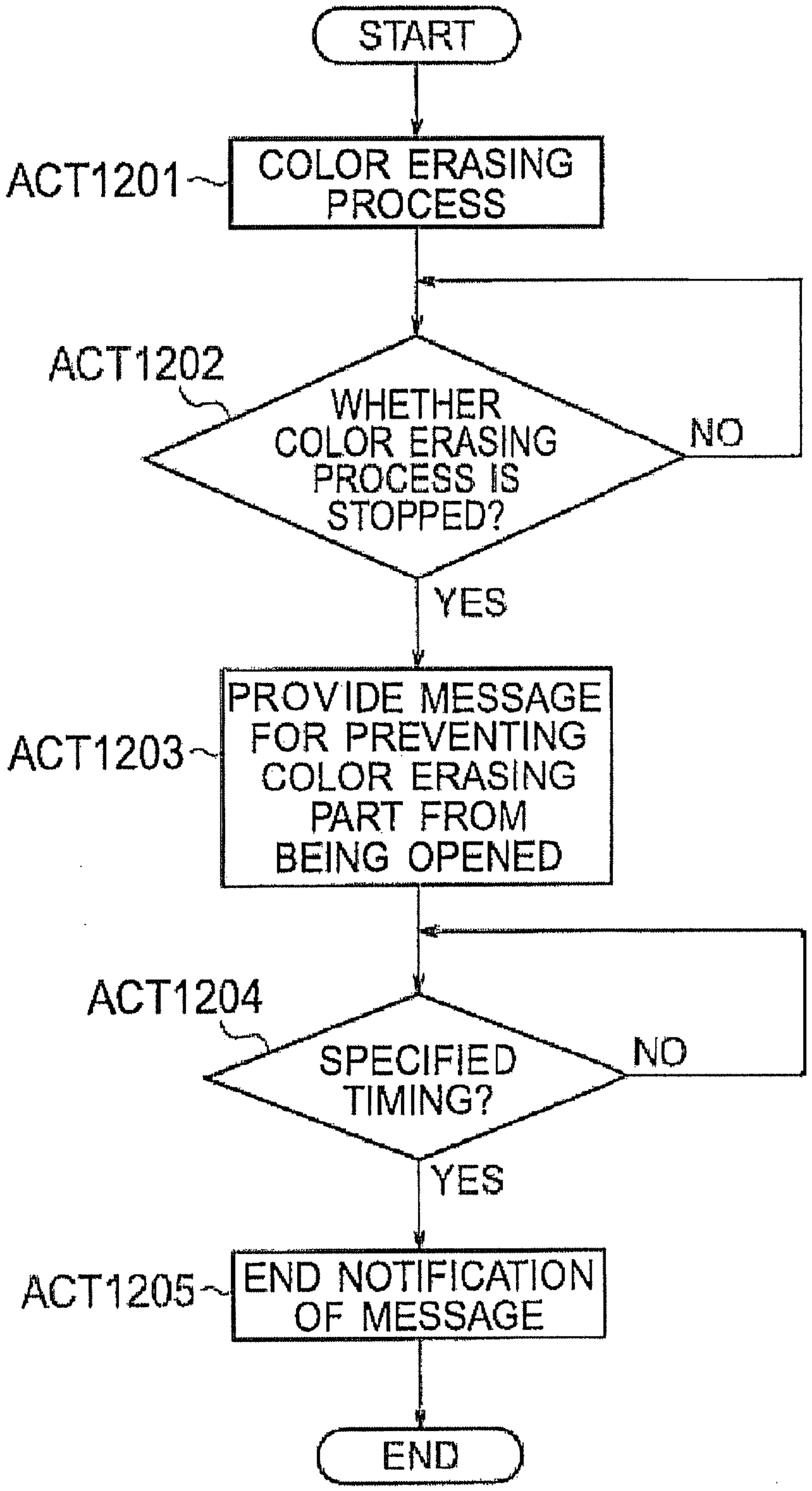
FIG. 12 is a flowchart for explaining a process of a color erasing apparatus of a third embodiment.

FIG. 12 is a flowchart for explaining the process of the color erasing apparatus 100 of this embodiment. If one of the foregoing process modes is selected through the operation part 124, and the start of the color erasing process is instructed, the control part 200 of the color erasing apparatus 100 feeds one sheet from the paper feed tray 102 and conveys the sheet to the color erasing part 108. The control part 200 causes the color erasing part 108 to erase a color of an image on the sheet (ACT 1201). At ACT 1202, the control part 200 determines whether or not the color erasing process of the color erasing part 108 is stopped. Here, the "stop of the color erasing process" includes a case where the color erasing part 108 is stopped after the color erasing process to the sheet is ended and a case where the color erasing part 108 is stopped since a sheet jam occurs somewhere in the conveyance path 118 during the color erasing process.

Figure 13:
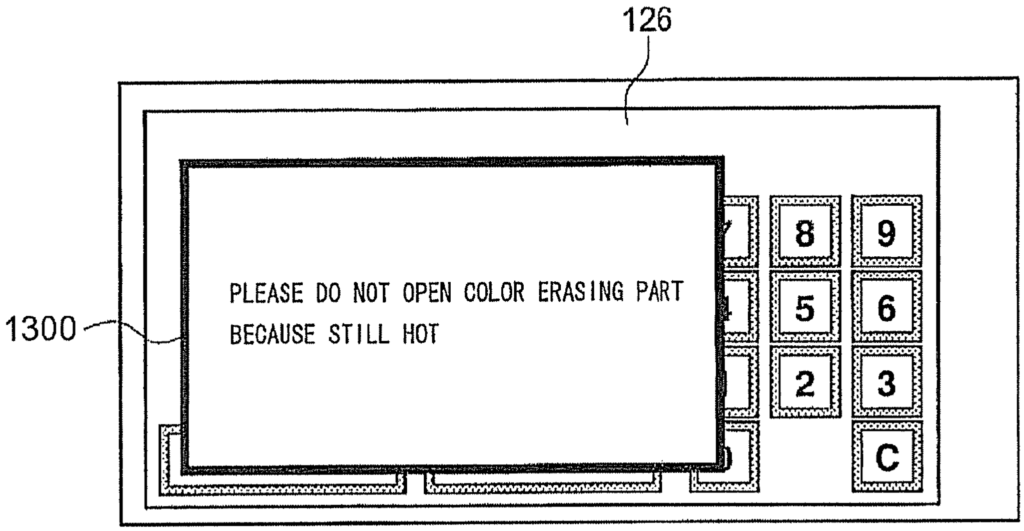
FIG. 13 is a schematic view for explaining a notification part.

If the color erasing process is stopped (Yes at ACT 1202), the control part 200 causes the notification part to provide a user a message that the color erasing part 108 should not be opened (ACT 1203). For example, as shown in FIG. 13, the control part 200 causes the display part 126 to display a message screen 1300 for preventing opening. Incidentally, the notification part is not limited to the display part 126 of the color erasing part 100. For example, screen data or a message to be displayed on a display part of an external user terminal may be transmitted through the external I/F 214. Alternatively, as shown in FIG. 7A, the color erasing apparatus 100 may include the light-emitting part 600 as the notification part. The light-emitting part 600 is a light source body such as an LED. When the color erasing process is stopped, the control part 200 causes the light-emitting part 600 to emit light as shown in FIG. 7B. Alternatively, the notification part may notify the user by sound. By this, the user refrains from opening the color erasing part 108 for a while, or even if the user opens the color erasing part, the opening can be carefully performed.

Figure 7:
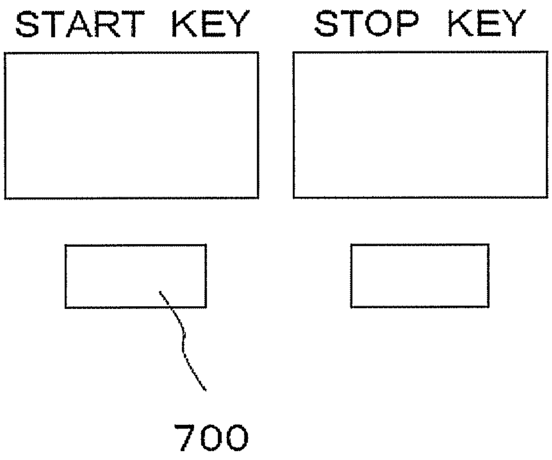
FIG. 7A is a schematic view for explaining a light-emitting part as a notification part.
FIG. 7B is a schematic view for explaining a state where the light-emitting part as the notification part is lighted.
Figure 7:
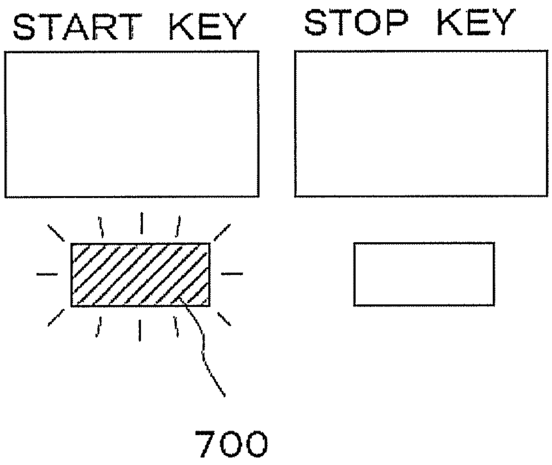

At ACT 1204, the control part 200 determines whether or not specified timing occurs. If the control part 200 determines that the specified timing occurs (Yes at ACT 1204), the control part ends the message notification of the notification part (ACT 1205). For example, the control part 200 turns off the message screen 1300 for preventing opening shown in FIG. 13. If the notification part is the light-emitting part 600 as shown in FIG. 7, the control part 200 stops the light emission of the light-emitting part 600. If the control part 200 determines that the specified timing does not occur (No at ACT 1204), the control part 200 continues the message notification of the notification part. That is, here, the specified timing is the time when, after the color erasing part 108 is stopped, the temperature of the color erasing part 108 becomes equal to or lower than a value at which there is no problem even if the user touches.

The control part 200 determines whether the specified timing occurs based on information of at least one of the temperature of the color erasing part 108 and the elapsed time after the color erasing process is stopped. If the determination is made based on the temperature of the color erasing part 108, the control part 200 measures the temperature of the color erasing part 108 through the temperature sensor 109, and causes the message to be notified until the temperature of the color erasing part 108 becomes equal to or lower than a predetermined specified temperature. The specified temperature is stored in the memory 204 or the storage part 210. The specified temperature may be uniquely determined by the maker's design or may be set and changed by the user. On the other hand, if the determination is made based on the elapsed time after the color erasing process is stopped, the control part 200 measures the time elapsed after the color erasing process is stopped, and causes the message to be notified until the measured time reaches a predetermined specified time. The specified time is stored in the memory 204 or the storage part 210. The specified time may be uniquely determined by the maker's design or may be set and changed by the user. By this, the color erasing apparatus 100 can call user's attention until the temperature of the color erasing part 108 becomes sufficiently low.

According to the embodiment, the color erasing apparatus 100 can prevent the user from carelessly touching the color erasing part 108 at least during the period in which the color erasing part is in the high temperature state.

Fourth Embodiment

In the third embodiment, when the color erasing process is stopped, the message for calling user's attention is notified. In a fourth embodiment, if the color erasing part 108 is required to be opened, the control part 200 causes the notification part to notify a message for calling user's attention, and if the color erasing part 108 is not required to be opened, the control part notifies that the color erasing part 108 is not required to be opened. With respect to the respective parts of this embodiment, the same portions as those of the color erasing apparatus of the above embodiment are denoted by the same reference numerals and the feature portion of this embodiment will be described.

Figure 14:
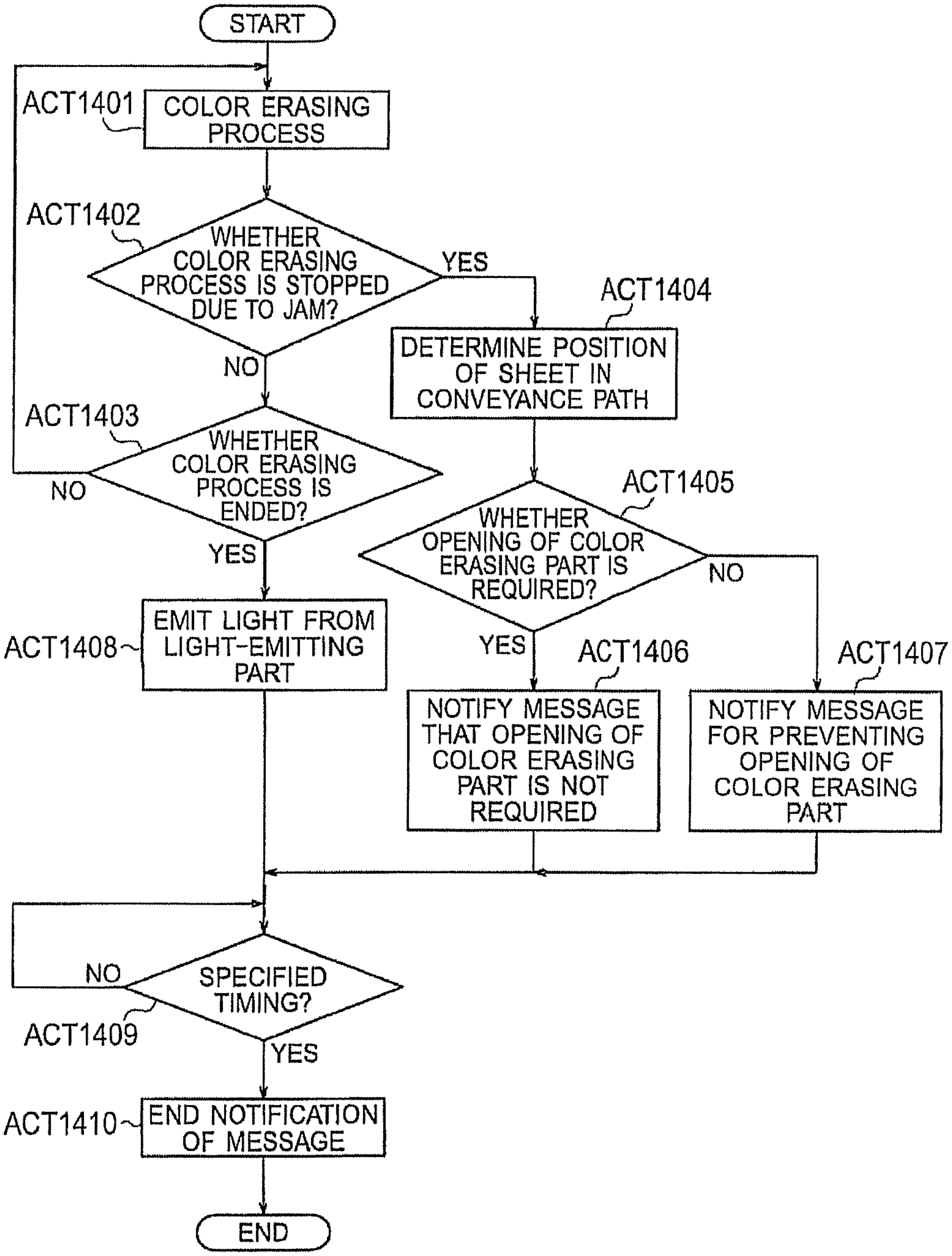
FIG. 14 is a flowchart for explaining a process of a color erasing apparatus of a fourth embodiment.

FIG. 14 is a flowchart for explaining the process of the color erasing apparatus 100 of this embodiment. If one of the foregoing process modes is selected through the operation part 124 and the start of the color erasing process is instructed, the control part 200 of the color erasing apparatus 100 feeds one sheet from the paper feed tray 102 and conveys the sheet to the color erasing part 108. The control part 200 causes the color erasing part 108 to erase a color of an image on the sheet (ACT 1401). Next, the control part 200 determines whether or not the color erasing process is stopped.

The control part 200 determines whether or not a sheet jam occurs in the conveyance path 118 during the color erasing process (ACT 1402). If the sheet jam does not occur (No at ACT 1402), the control part 200 determines whether or not the color erasing process to the sheet is ended (ACT 1403). If the color erasing process to the sheet is not ended (No at ACT 1403), the control part continues the color erasing process.

Figure 15:
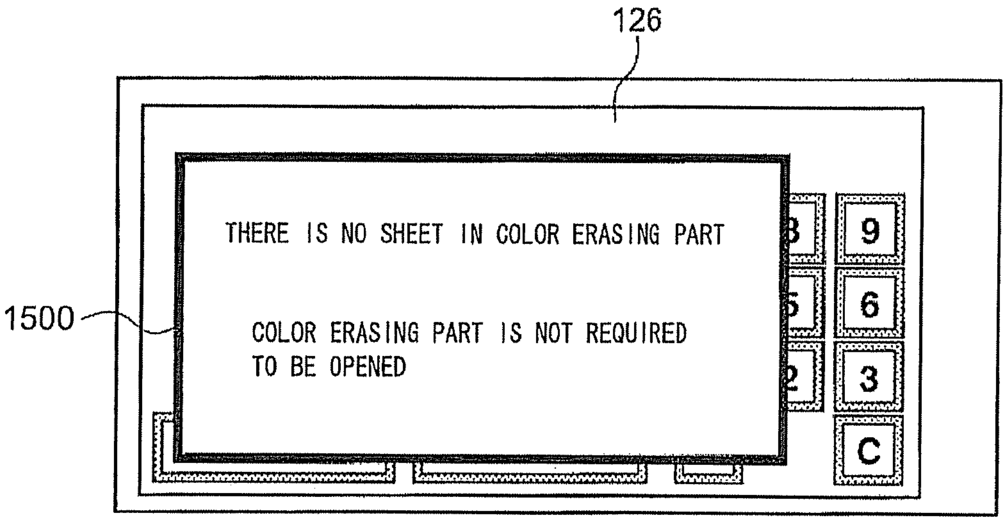
FIG. 15 is a schematic view for explaining a notification part.

On the other hand, if the color erasing process is stopped due to the occurrence of a sheet jam (Yes at ACT 1402), the control part 200 determines the position of the sheet based on a signal from the detection sensor 123 located at the conveyance path 118 (ACT 1404). The control part 200 determines, based on the detected sheet position, whether the color erasing part 108 is required to be opened in order to remove the sheet (ACT 1405). If a determination is made that the color erasing part 108 is required to be opened (Yes at ACT 1405), the control part 200 causes, for example, the display part 126 to display a message screen 1300 for preventing opening as shown in FIG. 13 (ACT 1406). On the other hand, if a determination is made that the color erasing part 108 is not required to be opened (No at ACT 1405), the control part 200 causes the display part 126 to display a message screen 1500 indicating that the color erasing part 108 is not required to be opened as shown in FIG. 15 (ACT 1407). By this, when a jam occurs, if the opening of the color erasing part 108 is required, the color erasing apparatus 100 can call user's attention, and can avoid a situation where the color erasing part 108 is opened although there is no necessity.

Besides, at ACT 1403, if the color erasing process to all sheets is ended and the color erasing part is stopped, the control part 200 causes the light-emitting part 600 shown in FIG. 7B to emit light (ACT 1408). If the screen as shown in FIG. 13 or FIG. 15 is displayed each time the normal color erasing process is ended, there is a fear that the user feels annoying. Then, if the color erasing part is stopped since the color erasing process to the sheet is ended, the color erasing apparatus 100 causes the light-emitting part 600 as the light emitting body to emit light, so that the annoying feeling for the user can be reduced. Further, the color erasing apparatus 100 causes the light-emitting part 600 to emit light, and indicates that the color erasing part 108 is hot. By this, the color erasing apparatus 100 has also the effect of calling user's attention.

At ACT 1409 and ACT 1410, the control part 200 performs the same process as ACT 1204 and ACT 1205 shown in FIG. 12.

According to the above embodiment, the same effect as the first embodiment is obtained, and the user's attention can be called more suitably.

Incidentally, at ACT 1408, instead of causing the light-emitting part 600 to emit light, the message screen 1500 shown in FIG. 15 may be displayed to indicate that the color erasing part 108 is not required to be opened.

Besides, the color erasing apparatus 100 of this embodiment is not limited to the structure in which if an abnormal end such as a jam occurs (Yes at ACT 1402), the screen as shown in FIG. 13 or FIG. 15 is displayed on the display part 126. If an abnormal end such as a jam occurs, the color erasing apparatus 100 may call user's attention by controlling the mode of lighting of the light-emitting part 600. For example, based on the position of the sheet, if the color erasing part 108 is required to be opened (ACT 1406), the control part 200 causes the light-emitting part 600 to blink, and if the opening of the color erasing part 108 is not required (ACT 1407) or a normal end occurs (ACT 1408), the control part 200 may cause the light-emitting part 600 to be always lighted. Besides, the modes of lighting at ACT 1406, ACT 1407 and ACT 1408 may be made different from each other. Alternatively, the color erasing apparatus 100 may be constructed so that the colors of emitted lights are different from each other.

While certain embodiments of the invention have been described, these embodiments have been presented by way of example only, and are not intended to limit the scope of the invention. These novel embodiments may be embodied in a variety of other forms, and various omissions, substitutions and changes may be made without departing from the gist of the invention. These embodiments and modifications thereof fall within the scope and gist of the invention and within the scope of the invention recited in the claims and their equivalents.

What is claimed is:

1. A color erasing apparatus comprising:

a conveyance member that conveys a sheet on which an image is formed of a color erasable coloring material;

a color erasing part that erases a color of the coloring material of the image formed on the sheet conveyed by the conveyance member;

a control part that counts a processed number of sheets with images that are color-erased by the color erasing part, determining whether the processed number of sheets exceeds a previously set threshold, and stopping a sheet color erasing process of the color erasing part after the sheets to be conveyed and color erased are used up; and a notification interface that outputs a signal for notifying that cleaning of the color erasing part is required at least if the processed number of sheets exceeds the threshold.

2. The apparatus of claim 1, further comprising a display part connected to the notification interface, wherein if the processed number of sheets exceeds the previously set threshold, the control part causes the display part to display that cleaning of the color erasing part is required.

3. The apparatus of claim 2, wherein if the processed number of sheets exceeds the previously set threshold, the control part causes the display part to notify a user that cleaning of the color erasing part is required, and stops a sheet color erasing process of the color erasing part at a specified timing.

4. The apparatus of claim 3, wherein the specified timing when the control part stops the sheet color erasing process of the color erasing part is a timing when the continuously processed number of sheets continuously color-erased by the color erasing part after the display part notifies reaches a previously set number of sheets.

5. The apparatus of claim 3, wherein the control part causes the display part to notify a user that cleaning of the color erasing part is required, and the specified timing when the sheet color erasing process of the color erasing part is stopped is one of a timing when the color erasing process is immediately stopped, a timing when the color erasing process is stopped after the color erasing process continues for a specified number of sheets, and a timing when the color erasing process is stopped after the color erasing process continues until sheets to be conveyed are used up.

6. The apparatus of claim 2, wherein if the color erasing part is cleaned, the control part resets the counted processed number of sheets.

7. The apparatus of claim 1, further comprising a light-emitting part that is connected to the notification interface and emits light if the cleaning of the color erasing part is required, wherein if the processed number of sheets exceeds the previously set threshold, the control part causes the light-emitting part to emit light.

8. The apparatus of claim 1, wherein if the processed number of sheets exceeds the previously set threshold, the notification interface outputs display data for causing a display part of an external apparatus to display that cleaning of the color erasing part is required to the external apparatus.

9. A color erasing apparatus comprising:

conveyance means for conveying a sheet on which an image is formed of a color erasable coloring material;

color erasing means for erasing a color of the coloring material of the image formed on the sheet conveyed by the conveyance means;

control means for counting the processed number of sheets images of which are color-erased by the color erasing means and determining whether the processed number of sheets exceeds a previously set threshold, and stopping a sheet color erasing process of the color erasing means after the sheets to be conveyed and color erased are used up; and notification interface means for outputting a signal for notifying that cleaning of the color erasing part is required at least if the processed number of sheets exceeds the threshold.

10. The apparatus of claim 9, wherein if a processed number of sheets exceeds the previously set threshold, the control means notifies a user that cleaning of the color erasing means is required, and stops a sheet color erasing process of the color erasing means at a specified timing.

11. The apparatus of claim 10, wherein the specified timing when the control means stops the sheet color erasing process of the color erasing means is a timing when the continuously processed number of sheets continuously color-erased by the color erasing means after the control means notifies a user that the cleaning of the color erasing means is required reaches a previously set number of sheets.

12. The apparatus of claim 10, wherein the control means notifies a user that cleaning of the color erasing part is required, and the specified timing when the sheet color erasing process of the color erasing means is stopped is one of a timing when the color erasing process is immediately stopped, a timing when the color erasing process is stopped after the color erasing process continues for a specified number of sheets, and a timing when the color erasing process is stopped after the color erasing process continues until sheets to be conveyed are used up.

13. A control method of a color erasing apparatus including a color erasing part, comprising:

erasing a color of a coloring material of an image formed on a conveyed sheet by the color erasing part;

counting the processed number of sheets with images that are color-erased;

stopping a sheet color erasing process of the color erasing part after the sheets to be conveyed and color erased are used up; and notifying a user that cleaning of the color erasing part is required at least if a processed number of sheets exceeds a previously set threshold.

14. The method of claim 13, wherein a notification interface is provided, and if the processed number of sheets exceeds a previously set threshold, the notification interface is made to display that cleaning of the color erasing part is required.

15. The method of claim 14, wherein if the processed number of sheets exceeds the previously set threshold, the notification interface notifies a user that cleaning of the color erasing part is required, and a sheet color erasing process of the color erasing part is stopped at a specified timing.

16. The method of claim 15, wherein the specified timing when the sheet color erasing process of the color erasing part is stopped is a timing when the continuously processed number of sheets continuously color-erased by the color erasing part after the notification interface notifies a user reaches a previously set number of sheets.

17. The method of claim 15, wherein the notification interface notifies a user that the cleaning of the color erasing part is required, and the specified timing when the sheet color erasing process of the color erasing part is stopped is one of a timing when the color erasing process is immediately stopped, a timing when the color erasing process is stopped after the color erasing process continues for a specified number of sheets, and a timing when the color erasing process is stopped after the color erasing process continues until sheets to be conveyed are used up.

18. The method of claim 14, wherein if the color erasing part is cleaned, the counted processed number of sheets is reset.

19. The method of claim 13, wherein a light-emitting part is provided that is connected to the notification interface and emits light if the cleaning of the color erasing part is required, and if the processed number of sheets exceeds the previously set threshold, the light-emitting part is made to emit light.

20. The method of claim 13, wherein if the processed number of sheets exceeds the previously set threshold, the notification interface outputs display data for causing a display part of an external apparatus to display that the cleaning of the color erasing part is required to the external apparatus.

* * * * *